(12) United States Patent
May (10) Patent No.: US 7,703,725 B2
(45) Date of Patent: Apr. 27, 2010

(54) ADJUSTABLE TRIPOD STAND

(76) Inventor: Randall L May, 2 Trafalgar, Newport Beach, CA (US) 92660-6830

( * ) Notice: Subject to any disclaimer, the term of this patent is extended or adjusted under 35 U.S.C. 154(b) by 227 days.

(21) Appl. No.: 11/262,396

(22) Filed: Oct. 31, 2005

(65) Prior Publication Data

US 2006/0049319 A1    Mar. 9, 2006

Related U.S. Application Data (63) Continuation-in-part of application No. 10/345,891, filed on Jan. 16, 2003, now Pat. No. 7,588,228.

(51) Int. Cl.
*F16M 11/00* (2006.01)

(52) U.S. Cl. .................... 248/163.1; 248/166; 248/431; 248/435; 248/440; 84/421

(58) Field of Classification Search ................ 248/166, 248/412, 170, 188.2, 171, 188.7, 188, 218.4, 248/219.3, 163.1, 168, 169, 188.91, 431, 248/435, 440; 403/381; 84/421; 396/419
See application file for complete search history.

(56) References Cited

U.S. PATENT DOCUMENTS

| | | | | |
|---|---|---|---|---|
| 1,227,850 A | * | 5/1917 | Stone | 248/673 |
| 1,517,825 A | * | 12/1924 | Bruneau | 248/171 |
| 1,894,695 A | * | 1/1933 | Ley | 248/171 |
| 3,462,110 A | * | 8/1969 | Cheslock | 248/219.4 |
| 3,570,130 A | | 3/1971 | Boehm | |
| 4,941,763 A | * | 7/1990 | Euteneuer | 403/3 |
| 5,064,024 A | * | 11/1991 | Barham | 182/201 |
| 5,072,910 A | * | 12/1991 | May | 248/412 |
| 5,335,575 A | * | 8/1994 | Hoshino | 84/421 |
| 5,645,253 A | * | 7/1997 | Hoshino | 248/181.1 |
| 6,935,463 B2 | * | 8/2005 | Brewster | 182/204 |
| 7,438,266 B2 | * | 10/2008 | May | 248/163.1 |
| 7,588,228 B2 | * | 9/2009 | May | 248/436 |

* cited by examiner

*Primary Examiner*—A. Joseph Wujciak, III
*Assistant Examiner*—Todd M. Epps
(74) *Attorney, Agent, or Firm*—Kirk A. Buhler; Buhler & Associates (57) ABSTRACT

An adjustable tripod stand having independently adjustable legs that includes an upright tube member for supporting an object, such as a drum, at its upper end. Independently movable collar members slidably mounted on the upright member and longitudinally adjustable relative to and past one another and to an upright portion for selective positioning thereon. A releasable fastener on the collars secures them to the upright member at selected positions. Three movable leg members are connected at their upper ends, two to one of the collar members and one to the other collar member. Movement of the collar members permits the stand to be erected in limited or confined areas. The stand preferably includes a leg extender member slidably mounted on the exterior one of the leg members, which is movable a selected distance permitting the stand to be positioned on different levels, such as stairs.

19 Claims, 7 Drawing Sheets

ADJUSTABLE TRIPOD STAND

CROSS REFERENCE TO RELATED APPLICATION

This application is a continuation-in-part of applicant's application Ser. No. 10/345,891 filed Jan. 16, 2003 now U.S. Pat. No. 7,588,228

FIELD OF THE INVENTION

This invention relates generally to tripod stands, and more particularly to an adjustable tripod stand for supporting various articles wherein the tripod stand has independently adjustable movable legs for installation on the steps of a stadium or auditorium.

BACKGROUND OF THE INVENTION

Tripod stands are desirable for supporting various articles and instruments since they provide selective height adjustment and a stable support. They are particularly useful is supporting such things as cameras, video equipment, telescopes, surveying instruments, and musical instruments. Tripod stands for drums, however, raise special problems when used on steps or stairs of an auditorium or stadium.

There are several patents that describe various adjustable tripod stand devices. Bruneau U.S. Pat. No. 1,517,825 shows a tripod support for a table having adjustable legs.

Ley U.S. Pat. No. 1,894,695 shows another tripod support for a table having adjustable legs.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a tripod type support for supporting the instrument in a reference position.

This invention is an improvement over May U.S. Pat. No. 5,072,910. It is distinguished over the prior art in general, and these patents in particular by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the tripod is adjustable in length, a sufficient amount, to permit support on two different stairs or steps of an auditorium or stadium.

When the upper leg supporting collar and the corresponding lower collar are moved toward each other on the upright portion, the bottom of the leg connected thereto will be extended radially outward to be positioned an unequal distance from the center of the upright portion relative to the other legs, and the upper leg supporting collar and the corresponding lower collar are moved away from each other, the bottom of the leg connected thereto will be drawn radially inward to be positioned an unequal distance from the center of the upright portion relative to the other legs. The one adjustable leg of the tripod allows the stand to be erected on multi-level surfaces.

Various objects, features, aspects, and advantages of the present invention will become more apparent from the following detailed description of preferred embodiments of the invention, along with the accompanying drawings in which like numerals represent like components.

BRIEF SUMMARY OF THE INVENTION

It is therefore an object of the present invention to provide an adjustable tripod stand that has independently adjustable movable legs.

It is another object of this invention to provide an adjustable tripod stand that allows for multiple angularities and tripod configurations.

Another object of this invention is to provide an adjustable tripod stand that has two or more independently adjustable movable legs providing versatility and stability in the support system.

Another object of this invention is to provide an adjustable tripod stand that allows for the body of the stand to be oriented in an off-axis position while maintaining the center of gravity in a stable support system.

Another object of the invention is to allow collars that support the legs, to be slidably adjusted past each other to allow for a greater variety of adjustment.

Another object of the invention is to provide an adjustable support leg positioned on the tripod stand and under a musical instrument to provide additional support to the musical instrument while it is being played.

Another object of the invention is to provide a spring or gas charged strut within the tripod stand that assists in the extension of telescoping members.

Another object of the invention is to provide additional extension legs that can be used in combination with the legs of the tripod stand to give greater extension capability for placement of the tripod stand on uneven surfaces.

Another object of the invention is for the geometry of the center tube and the legs to be essentially the same to allow for part commonality and interchangeability.

Another object of the invention is to provide the stand with at least one leg that is different length than the remaining legs to pre-set or prone the stand off axis for a cantilevered load.

Another object of the invention is to allow the position of the leg brace to be adjustable to allow the angular arc or position of the leg to be adjusted beyond a single fixed fulcrum brace point.

A still further object of this invention is to provide an adjustable tripod stand for supporting articles which is simple in construction, light-weight, economical to manufacture, rugged and reliable in use.

A further object of the present invention to provide an adjustable tripod stand that has independently adjustable movable legs for supporting drums, including timbale, tenor, snare, and bass drums.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
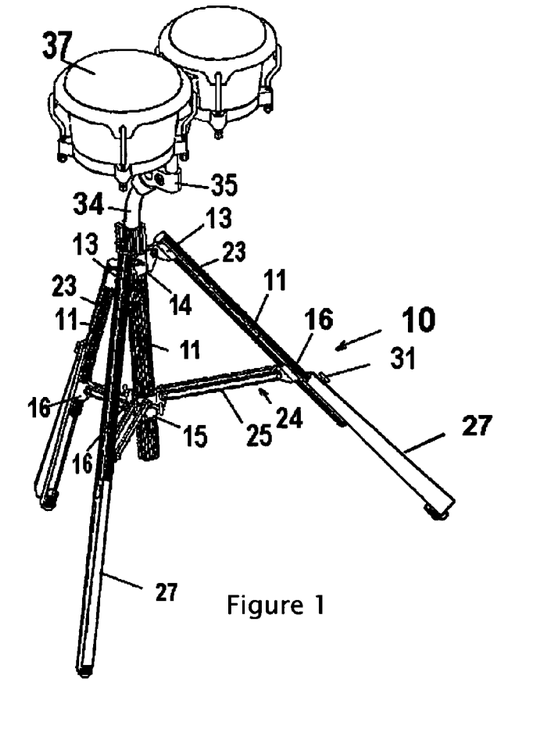
FIG. 1 is an isometric view of a preferred, adjustable-tripod-stand for bongo drums in accordance with one embodiment of the present invention.
Figure 2:
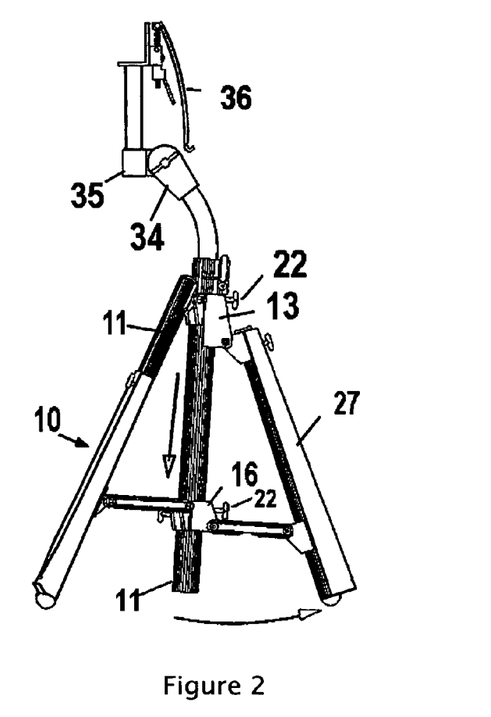
FIG. 2 is a view in side elevation of the adjustable tripod stand shown in FIG. 1.
Figure 3:
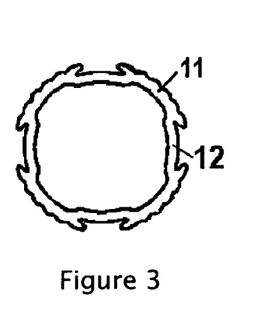
FIG. 3 is an end view of one of the center tubes or legs of the tripod.

Referring to the drawings by numerals of reference, there is shown in FIGS. 1-7, a preferred adjustable tripod stand 10 having a longitudinal upright center tube 11, which is fluted with a plurality of circumferentially spaced grooves 12 extending longitudinally of its exterior surface. There are four grooves 12 as shown in FIG. 3, which are equally spaced and dovetail shaped in cross section. Fluted tubes 11 are used for the upright support of the tripod and for the legs 23.

A semi-circular (half tube) upper leg support collar member 13 (FIGS. 1, 2, 4, 6, 7 and 9) for one of the legs 23 and a collar member 14 (FIGS. 1, 5, 6) for two of the legs 23 are slidably mounted on center tube 11. Semi-circular leg brace support collar members 16 for one of the legs 23 and a collar member 15 for two of the legs 23 are slidably mounted on center tube 11. In the preferred embodiment one of the legs is configured in a different length than the other legs. The difference in length of the one leg produces places the center tube in an off vertical axis or prone condition that is ideal for cantilevered placement of a percussion instrument. The cantilevered orientation allows the player to position themselves closer to the instrument being played with minimal interference from the leg(s). In the embodiments shown the leg is shorter than the remaining two legs, but it is also contemplated that the leg be configured longer than the remaining two legs.

Each of the collar members 14, and 15 (FIG. 5) is semi-circular in cross section with the longitudinal edges 17 formed inwardly to fit in the dovetail longitudinal grooves 12 (FIG. 3). The geometry of the center tube (FIG. 3) and the geometry of the legs could be (FIG. 12) essentially the same allowing for interchangeability of the center tube and leg components. Collar member 13 (FIG. 4) has portion 18 with in-turned portions 17 and ears 19 with holes 20 for receiving a hinge bolt 21. FIG. 3 shows a preferred embodiment of the dovetail longitudinal groves arranged in 90 degree orientation pattern, but other arrangements including but not limited to 30, 45, 60, and 120 degree orientations or combinations thereof are contemplated that will provide the desired result. A 120 degree configuration is shown and described in more detail with FIG. 16.

Each of the collar members 13, 16 is independently movable relative to the others on tubular member 11. Wing screws 22 (FIG. 2) are provided on the collar members 13, 16 and when tightened, the collar members 13, 16 are locked in a desired position on center tube 11.

The leg brace support collar members 13, and 16 are substantially similar in construction and operation to the upper leg support collar members 14, and 15. Each collar member 16 is semi-circular (half tube) in cross section with the longitudinal edges bent inwardly to fit in the longitudinal grooves 12, similar in construction to collar members 13 and 16.

Each collar member 16 has wing screws 22 for locking it in place in the same manner as collar members 13. Thus, each collar 16 is independently movable relative to the others on the center tube, and each may be locked in a desired position on the tube 11.

Figure 4:
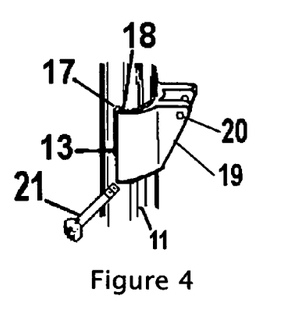
FIG. 4 is an isometric view of one of the leg clamps positioned on the center tube or leg tube of the tripod.
Figure 5:
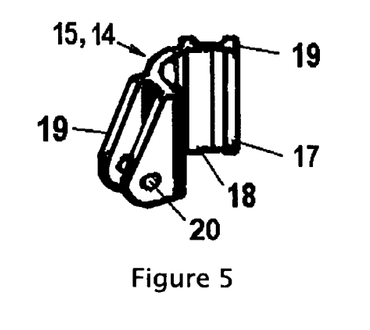
FIG. 5 is an isometric view of one of the leg clamps for the tripod shown in FIGS. 1 and 2.
Figure 6:
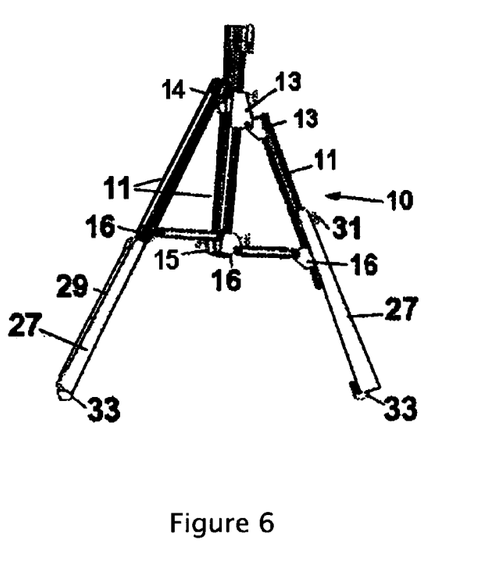
FIG. 6 is a view in side elevation of the stand of FIG. 1, illustrating vertical adjustment of the center post.
Figure 7:
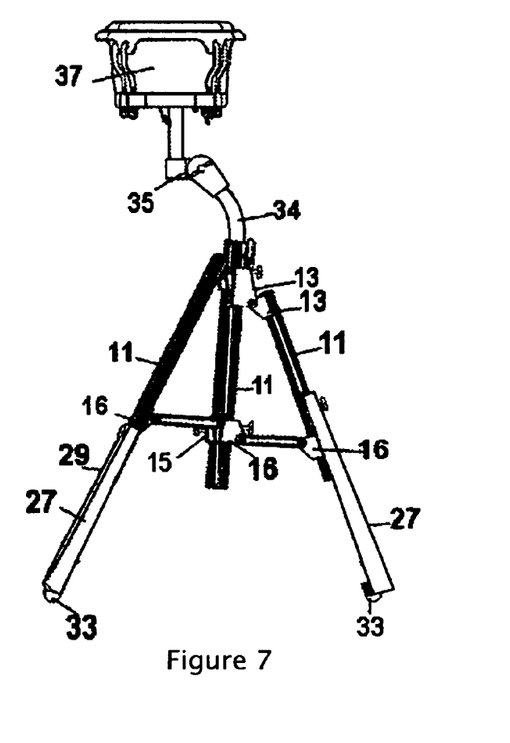
FIG. 7 is a view in side elevation of the stand of FIG. 1, illustrating vertical adjustment of the tripod legs relative to the leg position shown in FIG. 2.
Figures 8, 9:
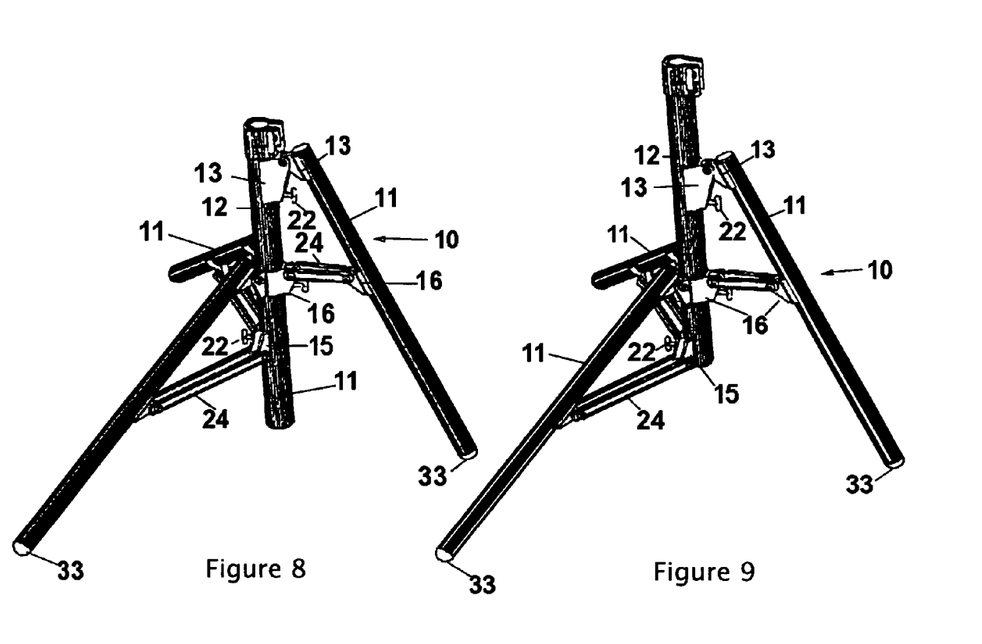
FIGS. 8 and 9 show isometric views illustrating vertical adjustment of the center post positioned on the legs.

Each of the collar members 14 and 15 (FIG. 5) has a semi-circular (half tube) portion with longitudinal edges bent inwardly to fit in the longitudinal grooves 12. Collar member 14 and 15 have two sets of ears 19 spaced 120° apart with holes 20 for receiving a hinge bolt 21 (FIG. 4).

Figure 10:
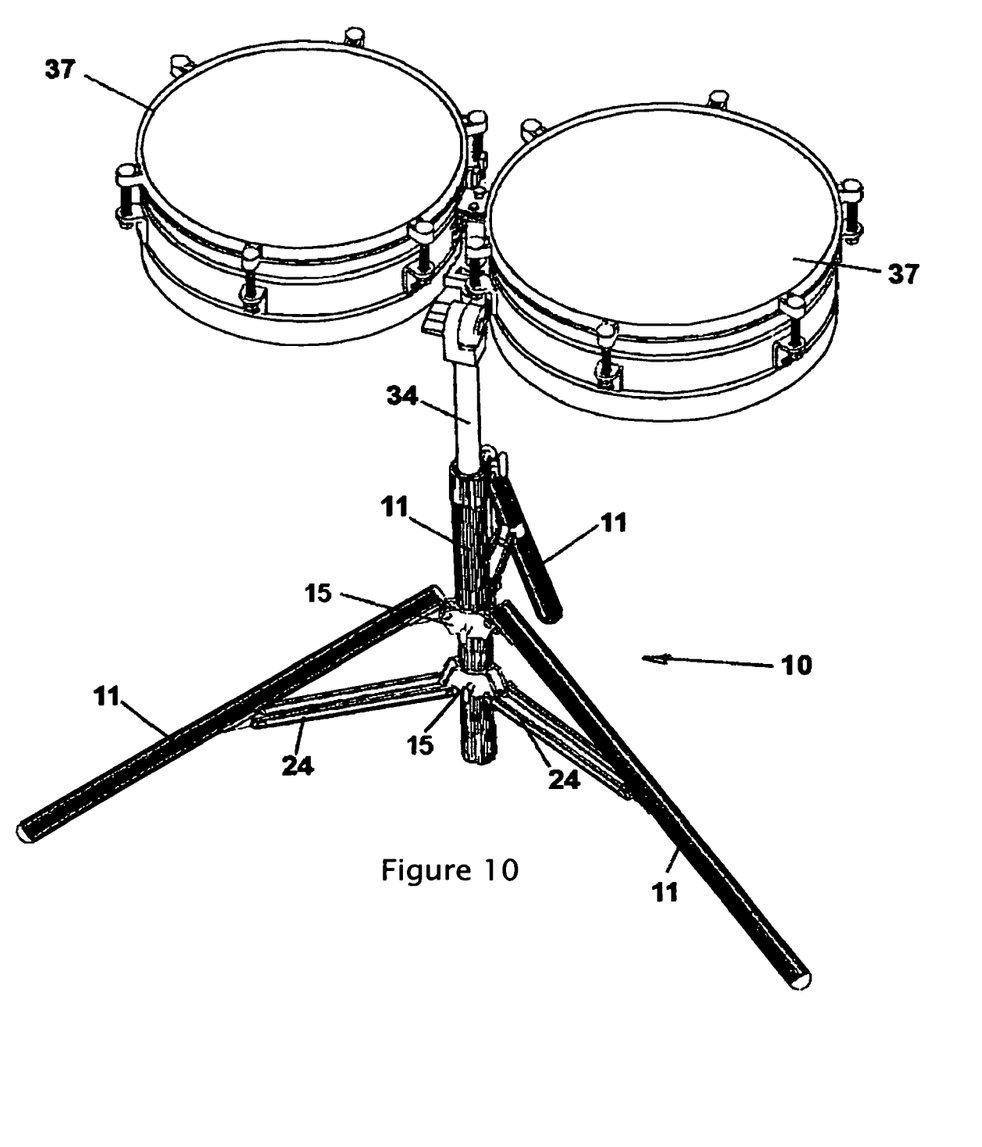
FIG. 10 is an isometric view of a preferred, adjustable-tripod-stand for timbale drums with drums installed in accordance with one embodiment of the present invention.

The upper end of each leg member 23 is pivotally mounted on center tube 11. Collar members 13 and 14 on center tube 11 are slidably mounted in grooves 12 and pivotally connected to collar members 13 on leg 23. Two of the leg members 23 are supported on collar member 14, and one leg member 23 on collar 13 at the top of the center tube 11 to form the tripod. Each leg member 23 has a leg brace 24 comprising a pair of flat bars 25 pivotally connected at one end to collars 16 and 15 on center tube 11. The other ends of bars 25 are connected to collar 16 on leg member 23. The position of the leg brace on the leg is adjustable to change the angular arc for the leg position. Ideally the leg brace is placed in the middle of the length of the leg, but other locations of the leg brace can be set to change how far the leg can be extended from the center tube. In one contemplated embodiment the position of the brace 16 on the shorter leg (FIGS. 8, 9 and 10) can be placed at the apex where the longer legs are secured to center tube 11. This provides additional support to the tripod stand to prevent or reduce flexing or motion while an instrument is being played.

Figure 11:
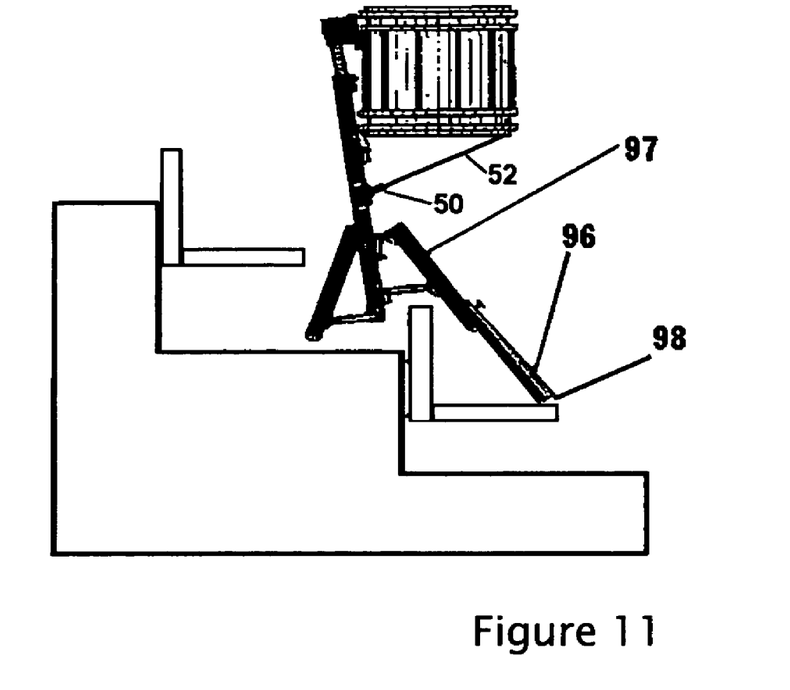
FIG. 11 is a detailed side view of one of the tripod legs with a leg extender in the extended position.

Each of leg members 23 has a leg extender member 27 slidably supported thereon as shown in FIG. 11. Leg extender member 27 has a semi-circular (half tube) collar portion 28 and a rigid leg portion 29. Collar portion 28 has longitudinal edges 30 (FIG. 13) formed inwardly to fit in the dovetail longitudinal grooves 12 (FIG. 12) for sliding movement to extend one of the leg members 23.

A wing screw 31 (FIGS. 1, 6, 13) fits threaded aperture 32 (FIG. 13) in leg extender member 27 for locking in any selected position. The bottom end of each leg extender member 27 has a footpad 33 (FIGS. 6, 7, 8 and 9) formed of resilient material. It should be understood that the bottom end of each leg member 27 may have a wheel or caster (not shown).

An elongate telescoping inner tubular member 34 (FIGS. 1, 2 and 7) is slidably received within the center tube 11 and anchored in position by a wing screw. Elongated center tube 11 can have a spring, gas filled strut or other similar lifting mechanism incorporated within the center tube 11 to assist a user to extend the telescoping inner tube member 34 out of the center tube 11. The upper end of inner telescoping tubular member 34 has a bracket 35 and pivoted locking member 36 for securing drums 37 in place. This tripod is designed for supporting a bongo drum but other drums may be supported if desired.

As seen in FIGS. 6-10, the upper leg collar segments 13, 14 and leg brace collar segments 16, 15 are movable from a position where the tripod legs are collapsed to a position where the bottom of the legs will extend radially an equal distance from the center of the tubular member 11.

If one of the upper leg collar segments 13, 14 and its corresponding leg brace collar segment 16, 15 is moved toward the other on the center tube 11, the bottom of the leg(s) connected thereto will be extended radially outward to be positioned an unequal distance from the center of the center tube 11 relative to the other leg(s).

When one of the upper leg collar segments 13, 14 and its corresponding leg brace collar segment 16, 15 is moved away from the other on the center tube 11, the bottom of the leg(s) connected thereto will be drawn radially inward to be positioned an unequal distance from the center of the tube 11 relative to the other leg(s).

This allows for placement of the stand in limited or confined areas. If the legs are supported on a level surface, this adjustment will cause the longitudinal, vertical axis of the stand to be disposed in an off-vertical axis position for placing the center of gravity of the supported article relative to the center of the supporting legs. This adjustment also provides a minimum or maximum peripheral support base.

Center tube 11 is adjustable up or down (FIGS. 6 and 7) relative to collar members 13, 14 and 16, 15. Leg extenders 27 are adjustable to permit the tripod assembly 10 to fit on different levels, when the tripod is used on the stairs or steps of a stadium or auditorium, In addition to the adjustment described above, the upper leg support collars 14, 15 and the leg brace collars 13, 16 may be positioned in vertically spaced pairs relative to the other vertically spaced pair. For example, one of the upper leg collar segments 13 or 16 and its corresponding leg brace collar segment 14 or 15 may both be moved upward on the tubular member 11 relative to the other pair and the bottom of the leg(s) connected to the upper pair will be raised relative to the other leg(s).

As described above, the legs may also be extended radially inward and outward. This allows for placement of the stand on an uneven or multi-level surface or platform and also in limited or confined areas. The legs may be adjusted relative to an uneven or multi-level surface to cause the vertical axis of the stand to be disposed in an off-vertical axis position for placing the center of gravity of the supported article relative to the center of the supporting legs even if they are at different heights.

Similarly, the top portion of the stand may have various conventional tripod mounting hardware for mounting a variety of articles and instruments including but not limited to such things as cameras, video equipment, telescopes, surveying instruments, and musical instruments. It should be understood that the particular tripod stand illustrated has a top portion configured to support musical drums however other top portions may be provided for supporting such things as cameras, video equipment, telescopes, surveying instruments, and the like.

Tripod for Tenor Drums

Each of leg members 53 may have a leg extender member slidably supported thereon as in FIGS. 1, 2, 6, 7, 11, 12 and 13. The leg extender member has a semi-circular (half tube) collar portion and a rigid leg portion. The collar portion has longitudinal edges formed inwardly to fit in the dovetail longitudinal grooves 12 for sliding movement to extend one of the leg members 27.

Figure 12:
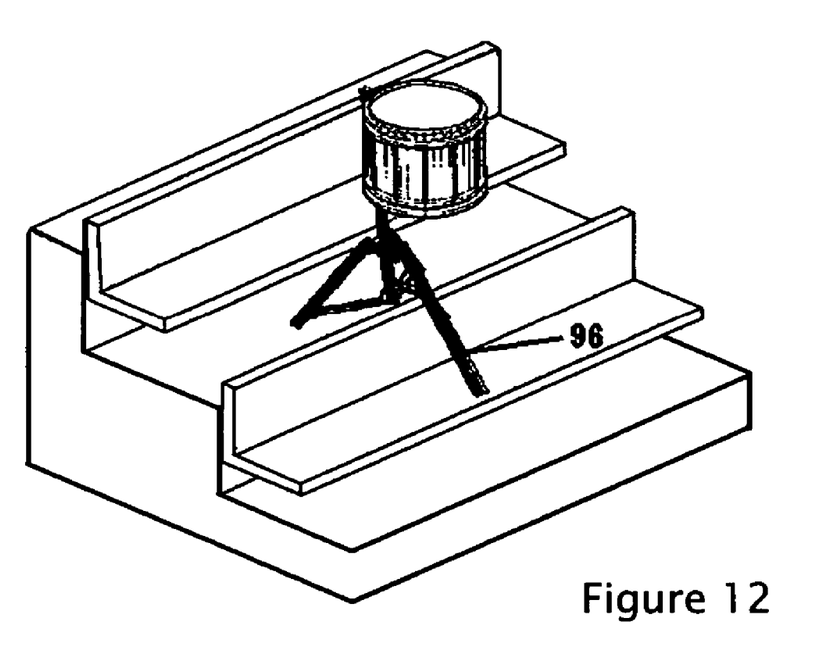
FIG. 12 is an isometric view of the tripod leg on which the extender is supported.
Figure 13:
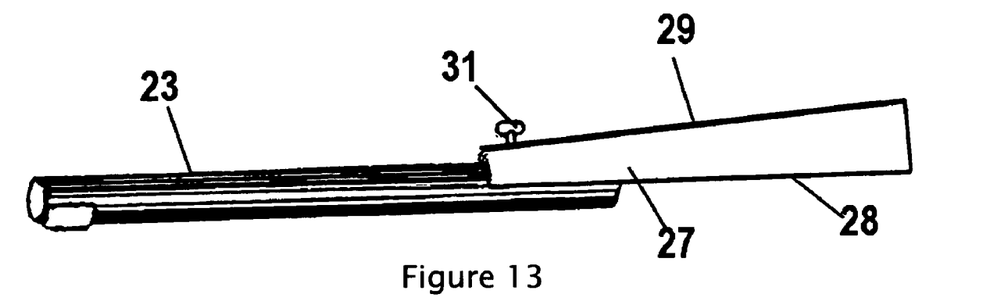
FIG. 13 is an side view of the leg extender shown in FIGS. 1, 2, 6, 7, 11 and 12.
Figure 14:
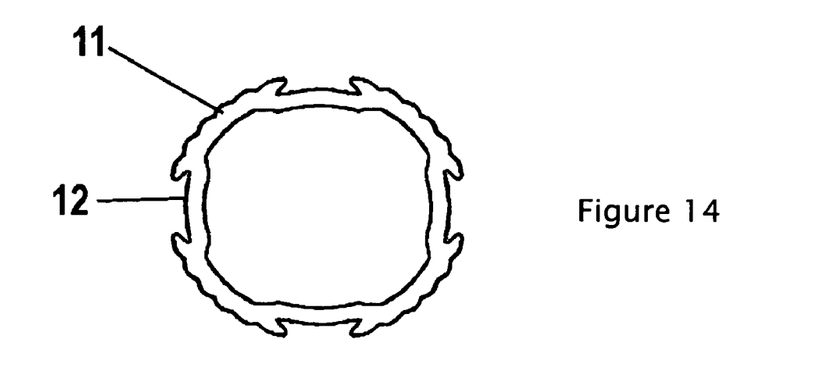
FIG. 14 is an end view of one of the center tubes or legs of the tripod.
Figure 15:
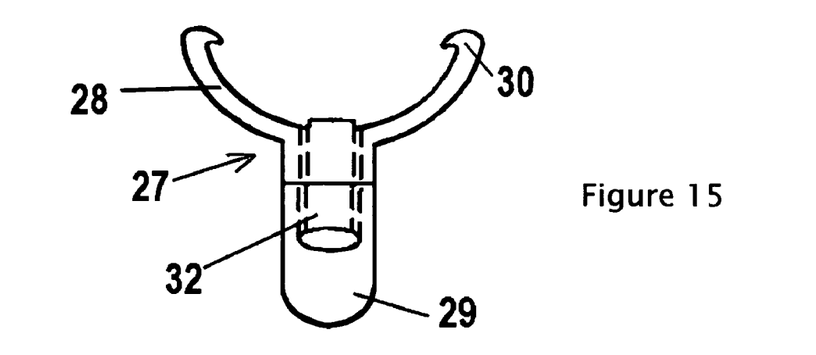
FIG. 15 is an end view of a slider that operates with the center tube shown in FIG. 14.

Referring now to FIGS. 11 and 12 that show a side elevation view and isometric view of the tripod and snare drums installed on the steps or stairs of a stadium or auditorium. The geometry of the center tube (FIG. 3) and the geometry of the legs (FIG. 12) can be the same allowing for interchangeability of the center tube and leg components. Each of leg members 97 may have a leg extender member 96 slidably supported thereon (construction being the same as in FIGS. 13-15). The leg extender member 96 has a semi-circular (half tube) collar portion and a rigid leg portion. The collar portion has longitudinal edges formed inwardly to fit in the dovetail longitudinal grooves 12 for sliding movement to extend one of the leg members 97. The bottom of the extendable leg member 96 is extended until it reaches ground, or in the figures shown, a lower bench 98. A collar member 50 is shown slidably attached to the center tube. A pivoting bracket 52 pivots and extends from the collar to the far underside of the drum in this figure. The collar and bracket provide additional support to the drum to reduce the cantilevered weight of the drum and reduce movement of the drum when it is being played. The collar member engages into the dovetail elongated grooves of the center tube and includes a locking mechanism to prevent movement on the center tube.

Figure 16:
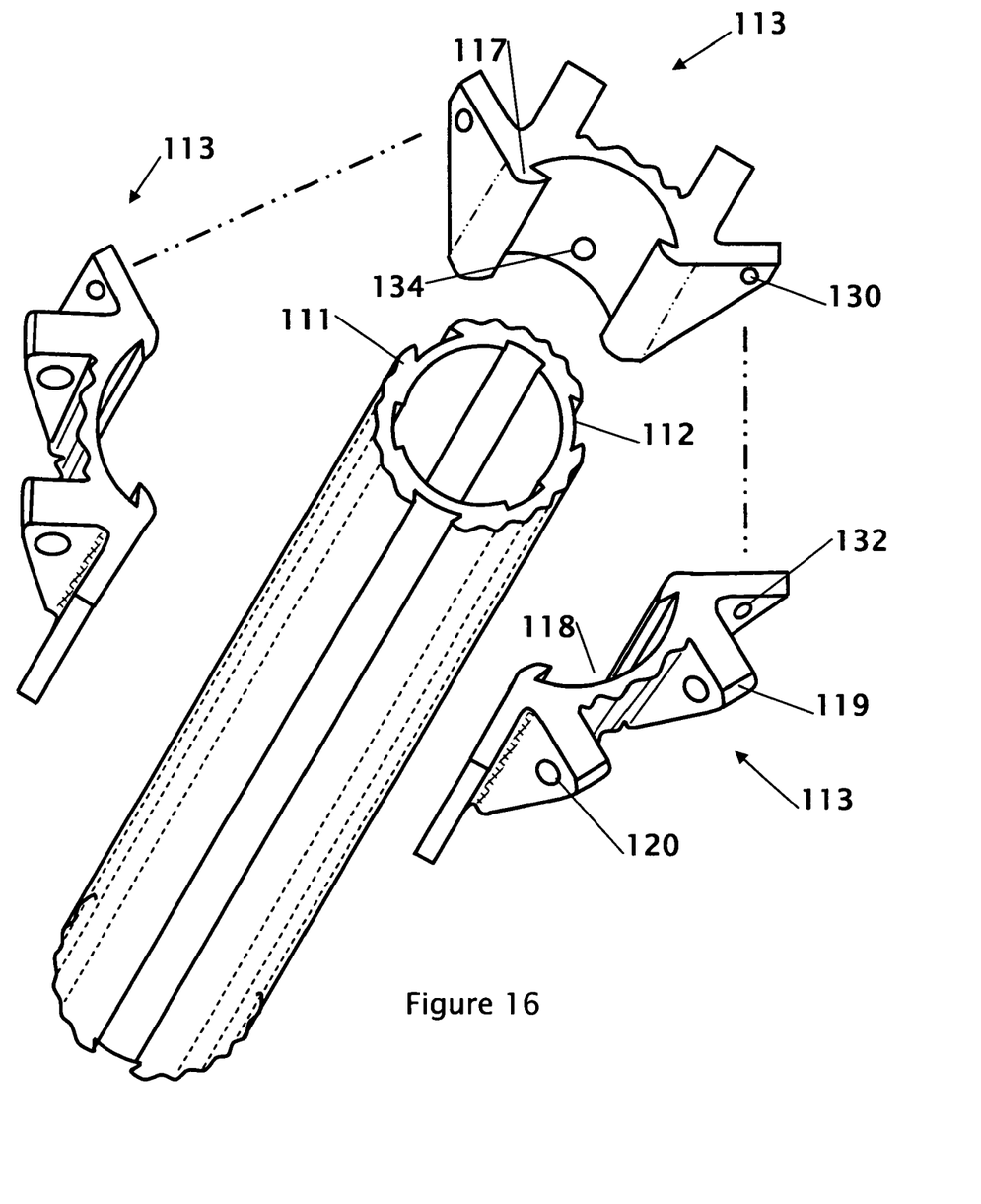
FIG. 16 is an isometric view of the three independent sliders on a center tube.

Referring to FIG. 16 that shows an isometric view of the three independent sliders on a center tube 111. The center tube is a longitudinal center tube, which is fluted with a plurality of circumferentially spaced grooves 112 extending longitudinally along its exterior surface. There are six grooves 112, which are equally spaced and dovetail shaped in cross section. Fluted tubes 111 are used for the center tube support of the tripod and for the legs.

A semi-circular (⅓ of a circle tube) upper leg support collar members 113 for one of the legs are shown. These three sets of sliders allow the three sets of legs to move and slide independent of each other and past each other. Two or all three of the collars can be connected or linked using the hole 130 and 132 on each flange to lock the collars together. In the preferred embodiment two of the collars are linked together and the third collar is independent from the other two. The linking of the collars provides for fewer components to adjust in the field and allows for faster set-up and take down.

Each of the collar members 113 is semi-circular in cross section with the longitudinal edges 117 formed inwardly to fit in the dovetail longitudinal grooves 112. Collar member 113 has portion 118 with in-turned portions 117 and ears 119 with holes 120 for receiving a hinge bolt.

Each of the collar members 113 is independently movable relative to the others on tubular member 111. Wing screws are provided on the collar members 113 and when tightened into hole 134, the collar members 113 are locked in a desired position on center tube 11.

Thus specific embodiments and applications for an adjustable tripod stand have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An adjustable tripod stand with adjustable leg support comprising:
   a center tube member for supporting a percussion instrument at its upper end, at least three leg members slidably connected to the center tube member with upper collars; wherein one of at least three leg members includes a leg brace; wherein the location of the leg brace moves longitudinally on the leg and independently on the center tube member to adjust the fixable position of the upper collar or the leg brace on the leg and to adjust the angle of the leg relative to the center tube.

2. The adjustable tripod and according to claim 1 including at least one leg extender member slidably mounted on the exterior of at least one of said leg members where the at least one leg extender member can slide past the location of the leg brace, and movement of said leg extender a selected distance permitting said stand to be positioned on substantially different levels.

3. The adjustable tripod stand according to claim 2 wherein at least one of the upper collars includes a semi-cylindrical collar segment slidably mounted on said leg members and having integrated reverse facing outer longitudinal edges for fitting in dovetail longitudinal grooves.

4. The adjustable tripod stand according to claim 1 in which said center tube member further includes a central telescoping member that longitudinal extends, and the center tube member includes fastening means for releasable securing said central telescoping member in a selected position.

5. The adjustable tripod stand according to claim 4 that further includes an internal extension mechanism to assist in the extending of the central telescoping member.

6. The adjustable tripod stand from claim 1 wherein geometry of the center tube member and the leg members are essentially the same.

7. The adjustable tripod stand according to claim 1 which further includes percussion instruments supporting means comprising of a collar member fitting that allows for vertical adjustment of the percussion instrument.

8. An adjustable tripod stand having independently adjustable legs comprising:
   a center tube member for supporting an object at its upper end,
   a first leg slidably connected to said center tube with a releasable securing means that allows one end of said first leg to be slidably secured along said center tube, said first leg further has a leg brace that is slidably connected at a first end along said first leg and slidably connected at a second end along said center tube,
   a second leg slidably connected to said center tube with a releasable securing means that allows one end of said second leg to be slidably secured along said center tube, said second leg further has a leg brace that is slidably connected at a first end along said second leg and slidably connected at a second end along said center,
   a third leg slidably connected to said center tube with a releasable securing means that allows one end of said third leg to be slidably secured along said center tube, said third leg further has a leg brace that is slidably connected at a first end along said third leg and slidably connected at a second end along said center tube, arranged such that
   said releasable securing means on said first, second and third legs and on said second end of said leg brace can move past each other on the said center tube member for selective positioning thereon to adjust the position of said legs on said center tube member.

9. The adjustable tripod stand according to claim 8 wherein at least two of the collars include a mechanism that allows the at least two collars to be locked together such that they move on the center tube as a single unit.

10. The adjustable tripod stand according to claim 8 including at least one leg extender member slidably mounted on the exterior of at least one of said legs where they slide past the location of the leg brace, and movement of said leg extender a selected distance permitting said stand to be positioned on substantially different levels.

11. The adjustable tripod stand according to claim 8 in which said center tube member further includes a telescoping member that longitudinal extends, and the center tube member includes fastening means for releasable securing said telescoping member in a selected position.

12. The adjustable tripod stand according to claim 11 that further includes an extension mechanism to assist in the extending of the telescoping member.

13. The adjustable tripod stand according to claim 8 which further includes percussion instruments supporting means comprises a collar member fitting for slidable locating on the vertical member for supporting at least one percussion instrument.

14. The adjustable tripod stand according to claim 8 wherein the releasable securing means and both ends of said leg braces are slidably mounted on said legs and said center tube with integrated reverse facing outer longitudinal edges for fitting in dovetail longitudinal grooves.

15. An adjustable tripod stand having an unequal leg comprising:
   a center tube member for supporting an object at its upper end,
   at least three legs connected to at least one movable collar member mounted on said center tube member and longitudinally adjustable on said center tube portion for selective positioning thereon wherein,
   each leg has a leg brace connected between each leg and said center tube member;
   at least one of the legs and the correspondence leg braces are intentionally configured to a different length(s) than the other legs to prone the center tube member to a non-vertical orientation, and at least one of said leg braces is movable longitudinally along its associated leg.

16. The adjustable tripod stand according to claim 15 in which said center tube member further includes a telescoping member that longitudinal extends, and the center tube member includes fastening means for releasable securing said telescoping member in a selected position.

17. The adjustable tripod stand according to claim 16 that further includes an extension mechanism to assist in the extending of the telescoping member.

18. The adjustable tripod stand from claim 15 wherein two legs are attached to one movable collar and the different length leg is connected to a second slidable collar.

19. The adjustable tripod stand according to claim 15 which further includes percussion instruments supporting means comprises a collar member fitting for slidable locating on the vertical member for supporting at least one percussion instrument.

* * * * *